(12) United States Patent
Frank

(10) Patent No.: US 7,141,296 B2
(45) Date of Patent: Nov. 28, 2006

(54) CAST POLYMER AND METHOD OF MAKING THE SAME

(76) Inventor: Irwin Frank, 7802 Cobblestone Cir., Middleton, WI (US) 53562

( * ) Notice: Subject to any disclaimer, the term of this patent is extended or adjusted under 35 U.S.C. 154(b) by 309 days.

(21) Appl. No.: 10/704,009

(22) Filed: Nov. 7, 2003

(65) Prior Publication Data

US 2004/0102556 A1    May 27, 2004

Related U.S. Application Data

(60) Provisional application No. 60/425,828, filed on Nov. 14, 2002.

(51) Int. Cl.
*B32B 7/02* (2006.01)
*B32B 5/14* (2006.01)
*B32B 9/04* (2006.01)
*C08K 3/00* (2006.01)

(52) U.S. Cl. .................. 428/212; 428/220; 428/307.7; 428/411.1; 428/441; 524/401; 525/191; 264/405

(58) Field of Classification Search ................ 428/212, 428/220, 307.7, 411.1, 441; 524/401; 525/191
See application file for complete search history.

(56) References Cited

U.S. PATENT DOCUMENTS

| | | | |
|---|---|---|---|
| 4,214,026 A * | 7/1980 | Ibata et al. | 428/67 |
| 4,375,489 A | 3/1983 | Muszynski | |
| 4,545,886 A | 10/1985 | de Nora et al. | |
| 4,911,326 A | 3/1990 | McGouran, Jr. | |
| 5,075,065 A | 12/1991 | Effenberger et al. | |
| 5,118,540 A | 6/1992 | Hutchison | |
| 5,441,772 A | 8/1995 | McAndrew et al. | |
| 5,667,542 A | 9/1997 | Law et al. | |
| 5,866,273 A | 2/1999 | Wiggins et al. | |
| 5,952,416 A * | 9/1999 | Tani et al. | 524/413 |
| 6,034,155 A | 3/2000 | Espeland et al. | |
| 6,048,593 A | 4/2000 | Espeland et al. | |
| 6,468,639 B1 * | 10/2002 | Ishikawa et al. | 428/209 |
| 6,627,704 B1 | 9/2003 | Yeager et al. | |

* cited by examiner

*Primary Examiner*—Rena Dye
*Assistant Examiner*—Lawrence Ferguson
(74) *Attorney, Agent, or Firm*—Joseph T. Leone, Esq.; DeWitt Ross & Stevens S.C.

(57) ABSTRACT

A composite material that includes from about 18 wt % to about 22 wt % of a thermosetting polymeric resin; and from about 82 wt % to about to about 78 wt % of an inorganic filler, wherein the inorganic filler comprises a mixture of particles wherein about 20 parts by weight of the mixture has an average particle size of about 10 µm or larger, about 15 parts by weight of the mixture has an average particle size of from less than 10 µm to about 5 µm, and about 10 parts by weight of the mixture has an average particle size of from about 3 to about 1 µm.

21 Claims, No Drawings

CAST POLYMER AND METHOD OF MAKING THE SAME

CROSS-REFERENCE TO RELATED APPLICATIONS

Priority is hereby claimed to provisional application Ser. No. 60/425,828, filed Nov. 14, 2002, the entire content of which is incorporated herein by reference.

FIELD OF THE INVENTION

The invention is directed to a cast polymer composition of matter, method of making the composition, and articles of manufacture comprised of the composition.

BACKGROUND

Various polymer concrete compositions are known in the art. As used herein, the phrase "polymer concrete" generally refers to composite materials that contain a polymer matrix impregnated or co-mingled with inorganic particulates. Alternatively, an inorganic material, such as portland cement (hardened or fresh), can be co-mingled with a liquid monomeric compound, which is then polymerized in place to yield the final composition. If the cement portion of the composite is fresh, then the polymerization reaction and the concrete hardening reaction are usually performed simultaneously. Other composite materials referred to herein as a "polymer concrete" do not contain a cement component per se. Rather these types of materials are composites that include a polymer matrix and an inorganic filler that itself is not a "cement," but an aggregate (e.g., gravel, sand, and the like) or a fine inorganic powder (e.g., silica, talc, and the like). Both types of composite materials fall within the term "polymer cement" as used herein. Polymer cements also generally include some type of catalyst to speed the polymerization reaction that binds the inorganic materials and the polymeric materials into a cohesive whole.

See, for example, U.S. Pat. No. 6,048,593, issued Apr. 11, 2000, to Espeland et al. The Espeland et al. patent describes a castable polymer concrete composition that includes an unsaturated vinyl ester resin and an unsaturated polyester resin as the polymeric portion of the composite. Added to this polymer mix is about 10 to 40 wt % of a filler material having an average particle size of less than about 500 μm, and about 20 to 60 wt % of a filler material having an average particle size of from about 500 to 1,000 μm (the wt % being based on the total weight of the composition). The filler material is noted as including crystalline silica, amorphous silica, barium sulfate (baryte), mica, and glass or ceramic microspheres. See also U.S. Pat. No. 6,034,155, issued Mar. 7, 2000, to Espeland et al.

Polymer concrete compositions can be used in assorted fields, including in the fabrication of leak-proof storage containers. See, for example, U.S. Pat. No. 4,911,326, issued Mar. 27, 1990, to McGouran, Jr. In the McGouran patent, an underground storage tank includes an inner storage tank, that is surrounded by an outer containment shell fabricated from a polymer concrete. The primary purpose of the McGouran device is as an underground storage tank for gasoline. In the McGouran patent, the polymer concrete generally includes a polymer resin such as unsaturated polyester, epoxy, polystyrene, polymethyl methacrylate, and polyfuran resins. The inorganic filler used by McGouran is granite Polymer concrete composites can be remarkably durable. They can also have very desirable qualities, such as resistance to salts, acids, bases, and other corrosive materials. Thus, in additional to containment structures, polymer concrete materials are also used for fabricating pipes, tunnel support linings, bridge decks, counter-tops and sinks, corrosion-resistant electrolytic containers, and the like. See, for example, U.S. Pat. Nos. 4,545,886; 5,075,065; 5,118,540; and 5,441,772.

A more complex type of composite material is described in U.S. Pat. No. 5,866,273, issued Feb. 2, 1999, to Wiggins et al. Here, the composite is formed of iron-silica complexes which have been processed to yield particulate material having a protective shell. These particles are then bound together with a polymeric matrix to yield a radar-absorbing composite material.

SUMMARY OF THE INVENTION

A first embodiment of the invention is directed to a composite material. The composite material comprises from about 18 wt % to about 22 wt % of a thermosetting polymeric resin and from about 82 wt % to about to about 78 wt % of an inorganic filler. The inorganic filler portion of the composite has a defined particle size distribution. The inorganic filler portion comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm.

While not being limited by any underlying phenomena, it is believed that the particle size distribution of the inorganic filler yields a finished product that is harder, stronger, and more corrosion resistant than conventional polymer cement composite materials.

In the preferred first embodiment, the thermosetting polymeric resin is selected from the group consisting of vinyl ester resins, unsaturated polyester resins, epoxy resins, and combinations thereof Vinyl ester resins are preferred.

The preferred inorganic fillers are minerals, with Group IIA sulfates (magnesium sulfate, calcium sulfate, strontium sulfate, barium sulfate) being more preferred, and with barium sulfate being the most preferred inorganic filler. Other inorganic fillers, such as crystalline silica, amorphous silica, mica, glass, ceramics, and the like, can also be used in the present invention.

A second embodiment of the present invention is a method of making the composite material described earlier. The method comprises first mixing from about 18 wt % to about 22 wt % of a polymerizable monomer that yields a thermoset polymer with from about 82 wt % to about to about 78 wt % of an inorganic filler. As in the composition itself, the inorganic filler comprises a mixture of particles wherein about 20 parts by weight of the mixture has an average particle size of about 10 sum or larger, about 15 parts by weight of the mixture has an average particle size of from less than 10 μm to about 5 μm, and about 10 parts by weight of the mixture has an average particle size of from about 3 to about 1 μm, to yield a mixture. The mixture is then agitated at a pressure less than atmospheric pressure (preferably about 20 torr or less for a period of about 5 minutes or more). A catalyst, such as methyl ethyl ketone peroxide (MEKP) is then added to the mixture to catalyze polymerization of the monomer. The mixture with the catalyst added is then stirred under reduced pressure.

The resulting composition is then shaped as desired (e.g., by molding). When hard, the shaped article is then heated to a temperature of at least about 100° F. (37.8° C.) (and preferably at least 250° F. (121.1° C.)) to yield the finished product. The heating time will vary based on the mass and general shape of the article. Normally, about 4 hours of heating at 250° F. (121.1° C.) is ideal. The product may then be wet- or dry-sanded, milled, de-burred, or otherwise fine finished in conventional fashion.

It is preferred that the polymerizable monomer yields a thermoset polymeric resin selected from the group consisting of vinyl ester resins, unsaturated polyester resins, epoxy resins, and combinations thereof, with vinyl ester resin being preferred. The preferred inorganic fillers are those recited earlier. The steps that are taken at reduced pressure are preferably done at a pressure of about 20 torr or less (6,906 kg/m$^2$ or less; 0.67 atm or less).

A third embodiment of the invention are articles of manufacture made from the composite material described herein.

The composite material described herein is useful in any application where a stiff, strong, and chemically resistant surface is required. Thus, the composite material described herein is quite useful for making residential and industrial counter-tops, sinks, and other surfaces. The composite material can also be used for making decorative items where solid heft and a smooth finish are desirable. Thus, the material can be used to cast sculptures, game pieces, and functional items such as plates, serving dishes, ash trays, at the like. Once cured, the material of the present invention can be finished by conventional means such as wet-sanding to yield a finish that is highly polished and remarkably resistant to degradation by acids, bases, and high-temperatures. A distinct advantage of the present invention is that if a surface made using the subject material is damaged (e.g., by a scorch mark or other discoloration), it can be rejuvenated simply by sanding away the damaged portion.

DETAILED DESCRIPTION OF THE INVENTION

As noted in the Summary of the Invention, the composition of the present invention includes a polymeric resin. The preferred polymeric resins for use in the present invention are thermosetting vinyl ester resins. Such resins are readily available from numerous international commercial suppliers, including Dow Chemical Co. (Midland, Mich., USA), Superior Polymer Products (Calumet, Mich., USA), Fiber Glass Developments Corp. (Brookville, Ohio, USA), and Mechemco Industries (Mumbai, India). Unsaturated polyester resins and epoxy resins, which can also be used as the polymeric resin component of the present invention, can be obtained from these same (and many other) commercial suppliers. Vinyl esters are chemically similar to both unsaturated polyesters and epoxy resins. All three resins find extensive commercial use in fields such as the manufacture of automotive parts.

Vinyl ester resins are polymeric molecules wherein the individual monomers are linked to each other via ester bonds. Reactive vinyl groups are situated at the terminal ends of the polymer molecules, thus yielding the trivial generic name "vinyl esters." A typical example are vinyl ester resins based upon bisphenol-A. See, for example, U.S. Pat. No. 4,375,489. Unsaturated polyesters are closely related to vinyl esters, the principal difference being that unsaturated polyesters include reactive carbon-carbon double bonds within the backbone of the polymer chain (rather than solely at the termini). Typical examples of unsaturated polyester resins include resins based on isophthalic- and/or orthophthalic acid esters. Epoxy resins include reactive ethylene oxide moieties that function to link the individual monomers into a thermoset plastic. Typical examples of epoxy resins include styrenated epoxy vinyl ester resin and bisphenol-epoxy vinyl ester resin.

The preferred inorganic fillers for use in the present invention are minerals. The most preferred minerals are the Group IIA sulfates, namely: magnesium sulfate, calcium sulfate, strontium sulfate (celestine), and barium sulfate (baryte). Barium sulfate is preferred. Other inorganic fillers, such as crystalline silica, amorphous silica, mica, glass, ceramics, and the like, can also be used in the present invention. Suitable fillers are available commercially from numerous international suppliers, including S&B Industrial Minerals S.A. (Athens, Greece), S&B North America, Inc. (Brunswick, Ga., USA), and 20 Microns Limited (Baroda, India).

Of critical importance to the present invention is the average particle size distribution of the inorganic component of the composite material. Based on parts by weight of the inorganic filler component, it is preferred that about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm. Within these ranges, the preferred inorganic filler is about 20 parts by weight of particles having an average size of about 10 μm, about 15 parts by weight of particles having an average particle size of about 7 μm, and about 10 parts by weight of particles having an average particle size of about 3 μm.

The determination of average particle size can be accomplished by any means now known or developed in the future for determining average particle size. Suitable means for determining average particle size include mechanical screening, laser light-scattering, and Coulter-counting (a conventional and well known means of particle size determination that relies upon measuring conductivity of a suspension of the particles in a conductive liquid.)

The composition may also include any number of accessory ingredients, such as colorants, aggregate (to add variegation and "depth" to the finished product), and the like. If aggregate is added to the composition, it is preferred that it be added in an amount no greater than about 30 wt % of the entire composition. Colorants, pigments, and the like, are normally added in only very small quantities, about 0.5 wt % of the entire composition.

The preferred method for making an article of manufacture using the inventive composition of matter is as follows. First, from about 18 wt % to about 22 wt % of a polymerizable monomer that yields a thermoset polymer is mixed with from about 82 wt % to about to about 78 wt % of an inorganic filler. As noted earlier, the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm, to yield a mixture.

The mixing can be done in a vacuum bag to attain the reduced pressure. The pressure applied is preferably about 20 torr or less.

A catalyst capable of catalyzing polymerization of the monomer is then added to the mixture. Any number of suitable catalysts are known and widely available commercially. For vinyl-containing monomers, MEKP is the preferred catalyst. The catalyst is generally added in a very small amount, usually about 2 wt % or less. As is known in the art, the amount of catalyst required will depend upon the type of monomer chosen, the amount of monomer present in the mixture, the type of catalyst chosen, and the temperature at which the catalyst is added to the mixture.

The mixture is again agitated thoroughly, under a pressure less than atmospheric pressure to yield a castable composition of matter. The composition of matter is then shaped into any desirable form (e.g., by molding, extrusion, pultrusion, etc.). The shaped article is then cured by heating to a temperature of at least about 100° F. (37.8° C.) and preferably at least about 250° F. (121.1° C.). As noted earlier, the heating time will vary based on the mass and shape of the article. Generally, heating at 250° F. for 4 hours is sufficient. The cured article can then be final finished, if desired, by any means known in the art.

What is claimed is:

1. A composite material comprising:

from about 18 wt % to about 22 wt % of a thermosetting polymeric resin; and from about 82 wt % to about to about 78 wt % of an inorganic filler, wherein the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm.

2. The composite material of claim 1, wherein the thermosetting polymeric resin is selected from the group consisting of vinyl ester resins, unsaturated polyester resins, epoxy resins, and combinations thereof.

3. The composite material of claim 1, wherein the thermosetting polymeric resin is a vinyl ester resin.

4. The composite material of claim 1, wherein the inorganic filler comprises a mineral.

5. The composite material of claim 4, wherein the inorganic filler comprises a mineral selected from the group consisting of magnesium sulfate, calcium sulfate, strontium sulfate, barium sulfate, and combinations thereof.

6. The composite material of claim 4, wherein the inorganic filler comprises barium sulfate.

7. The composite material of claim 1, wherein the inorganic filler comprises a mineral selected from the group consisting of crystalline silica, amorphous silica, mica, glass, ceramics, magnesium sulfate, calcium sulfate, strontium sulfate, barium sulfate, and combinations thereof.

8. A method for making an article of manufacture, the method comprising:

(a) mixing from about 18 wt % to about 22 wt % of a polymerizable monomer that yields a thermoset polymer with from about 82 wt % to about to about 78 wt % of an inorganic filler, wherein the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm, to yield a mixture; and (b) agitating the mixture of step (a) under a pressure less than atmospheric pressure, and then (c) adding to the mixture of step (b) a catalyst capable of catalyzing polymerization of the monomer, to yield a catalyzed mixture; and then (d) mixing the catalyzed mixture of step (c) under a pressure less than atmospheric pressure to yield a composition of matter; and then (e) shaping the composition of matter of step (d) into an article of manufacture; and then (f) heating the article of manufacture of step (e) to a temperature of at least about 100° F. (37.8° C.).

9. The method of claim 8, wherein in step (a) the polymerizable monomer yields a thermoset polymeric resin selected from the group consisting of vinyl ester resins, unsaturated polyester resins, epoxy resins, and combinations thereof.

10. The method of claim 8, wherein in step (a) the polymerizable monomer yields a vinyl ester resin.

11. The method of claim 8, wherein in step (a) the inorganic filler comprises a mineral.

12. The method of claim 8, wherein in step (a) the inorganic filler comprises a mineral selected from the group consisting of magnesium sulfate, calcium sulfate, strontium sulfate, barium sulfate, and combinations thereof.

13. The method of claim 8, wherein in step (a) the inorganic filler comprises barium sulfate.

14. The method of claim 8, wherein in step (a) the inorganic filler comprises a mineral selected from the group consisting of crystalline silica, amorphous silica, mica, glass, ceramics, magnesium sulfate, calcium sulfate, strontium sulfate, barium sulfate, and combinations thereof.

15. The method of claim 8, wherein in steps (b) and (d) the pressure is about 20 torr or less (6,906 kg/m$^2$ or less).

16. The method of claim 8, wherein in step (f) the temperature is at least about 250° F. (121.1° C.).

17. An article of manufacture comprising:

a structure comprised of from about 18 wt % to about 22 wt % of a thermosetting polymeric resin; and from about 82 wt % to about to about 78 wt % of an inorganic filler, wherein the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm.

18. A composite material consisting essentially of:

from about 18 wt % to about 22 wt % of a thermosetting vinyl ester resin; and from about 82 wt % to about to about 78 wt % of an inorganic filler, wherein the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm.

19. The composite material of claim 18, wherein the inorganic filler is selected from the group consisting of magnesium sulfate, calcium sulfate, strontium sulfate, barium sulfate, and combinations thereof.

20. A composite material consisting of:
from about 18 wt % to about 22 wt % of a thermosetting vinyl ester resin; and
from about 82 wt % to about to about 78 wt % of an inorganic filler, wherein the inorganic filler comprises a mixture of particles wherein about 20 parts by weight of the mixture has an average particle size of about 10 μm or larger, about 15 parts by weight of the mixture has an average particle size of from less than 10 μm to about 5 μm, and about 10 parts by weight of the mixture has an average particle size of from about 3 to about 1 μm.

21. The composite material of claim 20, wherein the inorganic filler is selected from the group consisting of magnesium sulfate, calcium sulfate, strontium sulfate, barium sulfate, and combinations thereof.

* * * * *